United States Patent
Ito et al.

(10) Patent No.: US 7,132,622 B2
(45) Date of Patent: Nov. 7, 2006

(54) LASER MACHINING APPARATUS AND LASER MACHINING METHOD

(75) Inventors: Yasushi Ito, Ebina (JP); Futao Naruse, Ebina (JP); Osamu Maruyama, Ebina (JP)

(73) Assignee: Hitachi Via Mechanics, Ltd., Kanagawa-ken (JP)

( * ) Notice: Subject to any disclaimer, the term of this patent is extended or adjusted under 35 U.S.C. 154(b) by 0 days.

(21) Appl. No.: 10/921,224

(22) Filed: Aug. 19, 2004

(65) Prior Publication Data

US 2005/0045606 A1    Mar. 3, 2005

(30) Foreign Application Priority Data

Aug. 25, 2003  (JP)  ............................. 2003-208535
Mar. 17, 2004  (JP)  ............................. 2004-077065
Apr. 12, 2004  (JP)  ............................. 2004-117328

(51) Int. Cl.
    *B23K 26/00*  (2006.01)

(52) U.S. Cl. .................................... 219/121.82; 29/563

(58) Field of Classification Search ..............................
    219/121.67–121.69, 121.72, 121.82; 29/563
    See application file for complete search history.

(56) References Cited

U.S. PATENT DOCUMENTS

| | | | | |
|---|---|---|---|---|
| 3,730,595 | A * | 5/1973 | Yakubowski | ................. 406/72 |
| 4,027,246 | A * | 5/1977 | Caccoma et al. | ............ 700/121 |
| 4,413,820 | A * | 11/1983 | Meeker et al. | ................. 271/11 |
| 4,995,949 | A * | 2/1991 | Rhoades | ...................... 205/118 |
| 5,192,848 | A | 3/1993 | Miyakawa et al. | |
| 5,229,571 | A | 7/1993 | Neiheisel | |
| 5,500,507 | A | 3/1996 | Yoshiaki | |
| 5,532,450 | A | 7/1996 | Iwai et al. | |
| 5,856,923 | A * | 1/1999 | Jones et al. | .................. 700/121 |
| 5,929,765 | A * | 7/1999 | Urech et al. | ................. 340/674 |
| 5,980,591 | A * | 11/1999 | Akimoto et al. | ........... 29/25.01 |
| 6,013,894 | A * | 1/2000 | Cheng et al. | .......... 219/121.69 |
| 6,449,522 | B1 * | 9/2002 | Conboy et al. | ............. 700/121 |
| 6,536,344 | B1 * | 3/2003 | Kawamura et al. | ......... 101/477 |

(Continued)

FOREIGN PATENT DOCUMENTS

EP        0483652 A1    5/1992

(Continued)

*Primary Examiner*—Samuel M. Heinrich
(74) *Attorney, Agent, or Firm*—Wenderoth, Lind & Ponack, L.L.P.

(57) ABSTRACT

There is provided a laser machining apparatus, and a laser machining method using the same. The laser machining apparatus has a body portion having a plurality of laser irradiating sections and work mounting sections, a supplying stocker for supplying workpieces, and a discharging stocker for discharging the workpieces. The apparatus further comprises a supply-side transfer unit having work retaining tables capable of attracting/releasing the workpieces and being of the same number as the laser irradiating sections, and moving in vertical and horizontal directions, and a discharge-side transfer unit having work retaining tables capable of attracting/releasing the workpieces and being of the same number as the laser irradiating sections, and moving in vertical and horizontal directions. The supply-side transfer unit causes the supply-side work retaining tables to attract the workpieces from the supplying stocker one after another and moves these supply-side work retaining tables to the work mounting sections to place the workpieces thereon. The discharge-side transfer unit causes the discharge-side work retaining tables to attract the work pieces which have been machined at work mounting sections, and to move and discharge these workpieces to the discharging stocker.

15 Claims, 5 Drawing Sheets

U.S. PATENT DOCUMENTS

| | | | |
|---|---|---|---|
| 2002/0100748 A1* | 8/2002 | Andersen | 219/121.68 |
| 2004/0109751 A1* | 6/2004 | Whitcomb et al. | 414/744.1 |
| 2004/0132595 A1* | 7/2004 | Grob | 483/30 |
| 2004/0216674 A1* | 11/2004 | Linker et al. | 118/719 |

FOREIGN PATENT DOCUMENTS

| | | | |
|---|---|---|---|
| EP | 0522811 B1 | | 1/1993 |
| EP | 0565088 B1 | | 10/1993 |
| JP | 405023934 A | * | 2/1993 |
| JP | 409085471 A | * | 3/1997 |
| JP | 02000005835 A | * | 1/2000 |
| JP | 2001-139170 | | 5/2001 |
| KR | 2002070592 A | * | 9/2002 |

* cited by examiner

LASER MACHINING APPARATUS AND LASER MACHINING METHOD

BACKGROUND OF THE INVENTION

1. Field of the Invention

The present invention relates to a laser machining apparatus comprising a plurality of laser irradiating sections and work mounting tables disposed so as to face the laser irradiating sections, and to a laser machining method using the laser machining apparatus.

2. Description of Related Art

As a prior art laser machining apparatus, there is known a laser machining apparatus having a plate-like work supplying unit, as disclosed in Japanese Patent Laid-open No. 2001-139170 for example, comprising work transferring means for transferring plate-like workpieces from a first work mounting section to a second work mounting section, workpiece thickness detecting means for detecting whether or not one workpiece is mounted on the second work mounting section, and work transfer control means for controlling, when the workpiece thickness detecting means detects that a plurality of workpieces is mounted on the second work mounting section, the work transferring means to return extra workpieces to the first work mounting section until one workpiece is left on the second work mounting section.

However, in case of a laser machining apparatus comprising a plurality of work mounting sections, it takes time to transfer workpieces, and machining efficiency drops if the workpieces are to be transferred one by one.

Additionally, although a transfer time may be shortened by providing the same number of second work mounting sections as first work mounting sections, and by removing workpieces from a plurality of work mounting sections at the same time, this is not practical because it requires a large installation area for the laser machining apparatus.

BRIEF SUMMARY OF THE INVENTION

It is an object of the invention to solve the aforementioned problems by providing a laser machining apparatus, and a laser machining method, that require no large installation area while improving work efficiency.

A laser machining apparatus of the invention comprises:

a body portion having a plurality of laser irradiating sections disposed in line in a horizontal mono-axial direction, and work mounting sections disposed in line so as to face the laser irradiating sections;

a supplying stocker for supplying workpieces;

a discharging stocker for receiving the workpieces after having been processed;

a supply-side transfer unit having work retaining members capable of attracting/releasing the workpieces and being of the same number as the laser irradiating sections, and moving the work retaining members in a vertical and horizontal directions; and a discharge-side transfer unit having work retaining members capable of attracting/releasing the workpieces and being of the same number as the laser irradiating sections, and moving the work retaining members in the vertical and horizontal directions; wherein the supplying stocker and the supply-side transfer unit are disposed on one side in the axial direction, of the work mounting section, and the discharging stocker and the discharge-side transfer unit are disposed on another side thereof.

A laser machining method of the invention comprises:

a work retaining process of moving a plurality of supply-side work retaining members in vertical and horizontal directions to attract and retain workpieces from one supplying stocker;

a work mounting process of moving the supply-side work retaining members to work mounting sections disposed so as to face the same number of laser irradiating sections as the work retaining members, and of releasing the workpieces from the work retaining members so as to place the workpieces retained by the plurality of work retaining members on the work mounting sections; and a work discharging process of attracting a plurality of finished workpieces to discharge-side work retaining members after machining the workpieces, placed on the work mounting sections, by the laser irradiating sections, moving the work retaining members in vertical and horizontal directions and releasing the workpieces from these respective work retaining members to discharge the plurality of workpieces retained by the discharge-side work retaining members to one discharging stocker.

This arrangement allows a respective one of the work retaining members of the supply-side transfer unit to retain a workpiece while machining another workpiece retained by the work mounting section is machined or processed, and when this machining ends, allows a respective one of the work retaining members of the discharge-side transfer unit to retain the workpiece which has been machined on the work mounting section. Then, after removing this finished workpiece from the work mounting section by the work retaining member, the supply-side transfer unit is allowed to place a non-finished workpiece on the work mounting section to start machining and the finished workpiece retained by the work retaining member in the discharge-side transfer unit is allowed to be transferred to the discharging stocker.

Preferably, the inventive laser machining apparatus further comprises work mounting tables which are capable of supporting workpieces and are disposed at least in the supply-side transfer unit or the discharge-side transfer unit. This arrangement allows workpieces to be temporarily retained by the work mounting tables in retaining the workpieces by the work retaining members.

Further, a work mounting table disposed on a side of the supply-side transfer unit may be arranged so as to be movable in a mono-axial direction, and an interleaf mounting table, whereon an interleaf may be mounted, may be provided such that the interleaf mounting table is disposed at a vertically intermediate position between the movable work mounting table and the supplying stocker.

Additionally, the interleaf mounting table may be arranged to be movable in a mono-axial direction.

The work mounting table disposed on a side of the discharge-side transfer unit may be also arranged so as to be movable in a mono-axial direction.

It is also possible to provide an interleaf removing and carrying-out unit for removing an interleaf, placed on a non-finished workpiece, from the workpiece, and an interleaving unit for placing an interleaf on a workpiece whose machining has been finished, and to dispose the interleaf removing and carrying-out unit on a side of the supplying stocker and to dispose the interleaving unit on a side of the discharging stocker.

The inventive apparatus allows machining efficiency to be improved because it retains all workpieces to be machined next by the supply-side work retaining members while machining other workpieces, and it carries in or out a plurality of workpieces simultaneously by a one time conveyance. Furthermore, the invention allows an installation area of the apparatus to be reduced by providing one supplying stocker and one discharging stocker for the plurality of work mounting sections (tables).

The specific nature of the invention, as well as other objects, uses and advantages thereof, will clearly appear from the following description and from the accompanying drawings wherein the same reference characters denote the same or corresponding parts throughout several views.

DETAILED DESCRIPTION OF THE PREFERRED EMBODIMENTS

Modes for carrying out the invention will be explained below with reference to exemplary embodiments thereof and the accompanying drawings.

First Embodiment

Figure 1:
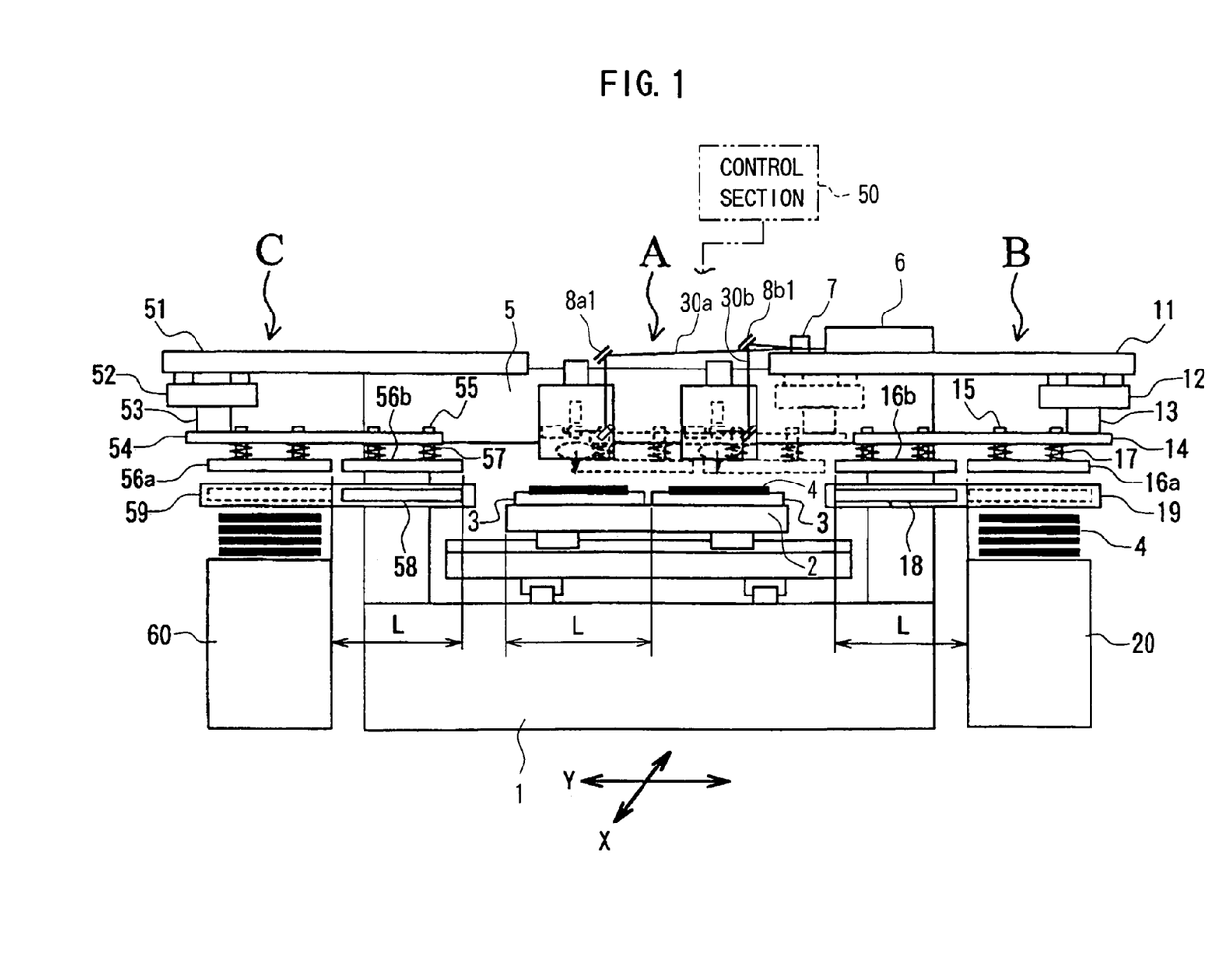
FIG. 1 is a front view showing an entire laser machining apparatus according to a first embodiment of the invention.
Figure 2:
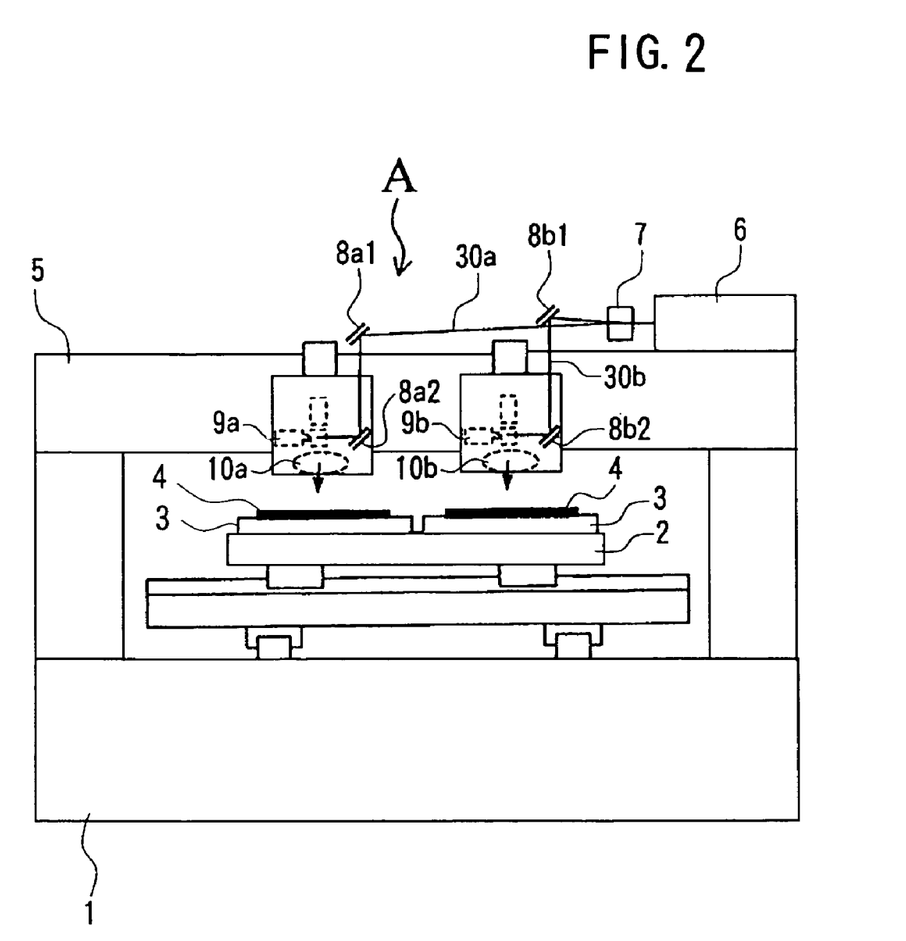
FIG. 2 is a front view showing a body portion of the laser machining apparatus.

FIG. 1 is a front view showing an entire laser machining apparatus according to a first embodiment of the invention, and FIG. 2 is a front view showing a body of the laser machining apparatus. As shown in FIG. 1, the inventive laser machining apparatus is composed of a body portion A, a carrying-in unit B and a carrying-out unit C.

Structure of the body portion A will be explained at first with reference to FIGS. 1 and 2. An XY table 2 is disposed on a bed 1 of the body portion A. The XY table 2 is movable on the bed 1 horizontally in X and Y directions. A plurality of (two in FIGS. 1 and 2) tables (work mounting sections) 3 is fixed on the XY table 2 separately by a distance L in the Y direction. A plurality of holes connected to a hollow section inside the tables 3 is formed in a surface of each table 3. The hollow sections are connected to a vacuum source (not shown) so that each table 3 can attract/release a workpiece 4.

A gate-type column 5 is fixed on the bed 1. A laser oscillator 6 is mounted on the column 5. An acoustic optical modulator 7 for switching an optical path of a laser beam to a first optical path 30a or to a second optical path 30b is disposed on an optical axis of the laser oscillator 6. A laser irradiating section or unit composed of mirrors 8a1 and 8a2 and a pair consisting of optical scanner 9a and fθ lens 10a is disposed in the first optical path 30a. A laser irradiating section or unit composed of mirrors 8b1 and 8b2 and a pair consisting of optical scanner 9b and fθ lens 10b is disposed in the second optical path 30b.

Next, an operation of the body portion A of the laser machining apparatus in machining workpieces 4 will be explained. The acoustic optical modulator 7 switches an optical path of a laser beam outputted from the laser oscillator 6 and causes the beam to enter the optical scanner 9a or 9b through the mirrors 8a1 and 8a2 or through the mirrors 8b1 and 8b2. Then, the beam is positioned in the X and Y directions to machine the workpieces 4 by passing through the fθ lens 10a or the fθ lens 10b. That is, it is possible to machine a workpiece even when the workpiece is put on only one table 3.

As shown in FIG. 1, a rail 11 permits a slider 12 in the carrying-in unit (supply-side transfer unit) B to reciprocate horizontally in the Y-direction in this figure. One end of a lifter 13 capable of extending/retracting in a vertical direction in FIG. 1 is fixed to a lower part of the slider 12. A plate 14 is fixed to another end (edge) of the lifter 13. The plate 14 supports two work retaining tables (work retaining members) 16a and 16b movably in the vertical direction in FIG. 1 through an intermediary of guide rods 15. The work retaining tables 16a and 16b are disposed apart from each other in the Y direction by a distance L. A plurality of holes connected to a hollow section inside the tables 16a and 16b is made in a lower face of the work retaining tables 16a and 16b. The hollow sections are connected to a vacuum source (not shown) so that the work retaining tables 16a and 16b can attract/release the workpiece 4. Springs 17 are provided contractedly between the work retaining table 16a and the plate 14 and between the work retaining table 16b and the plate 14, respectively, and bias the work retaining tables 16a and 16b away from the plate 14 to allow for motion of the plate 14 so that the plate 14 is not disturbed from continuously moving the other work retaining table when either one of the two work retaining tables contacts with the work receiving table 18 such that its movement is restricted.

A position of the slider 12 indicated by a solid line in FIG. 1 indicates its standby position (right end of its moving range) and a position indicated by a dotted line indicates its supplying position described later. When the slider 12 is located at the supplying position, the work retaining tables 16a and 16b face, respectively, the tables 3 on the XY table 2 positioned at a work delivering position. It is noted that when the slider 12 is located at the standby position, the plate 14 is positioned at a rising end. A supplying stocker 20 is disposed so as to face the work retaining table 16a when the slider 12 is located at the standby position. Workpieces 4 are stacked on an upper face of the supplying stocker 20.

A rail 19 is disposed at a position in the vertical direction interposed between the supplying stocker 20 and the work retaining tables 16a and 16b. A work receiving table (work mounting table) 18 is movable on the rail 19 horizontally in the Y-direction. It is noted that a standby position of the work receiving table 18 is a position when it is located at the left end of its moving range and at this time, the work receiving table 18 faces the work retaining table 16b when the slider 12 is located at its standby position. When the work receiving table 18 is located at the right end of its moving range (receiving position), the work receiving table 18 faces the work retaining table 16a when the slider 12 is located at its standby position.

A rail 51 permits a slider 52 of the carrying-out unit (discharge-side transfer unit) C to reciprocate horizontally in the Y-direction in FIG. 1. One end of a lifter 53 capable of extending/retracting in the vertical direction in FIG. 1 is fixed to a lower part of the slider 52. A plate 54 is fixed to another end (edge) of the lifter 53. The plate 54 supports work retaining tables (work retaining members) 56a and 56b movably in the vertical direction in FIG. 1 through an intermediary of guide rods 55. The work retaining tables 56a and 56b are disposed apart from each other in the Y direction by the distance L. A plurality of holes connected to a hollow section inside the tables 56a and 56b is made in a lower face of the work retaining tables 56*a* and 56*b*. The hollow sections are connected to a vacuum source (not shown) so that the work retaining tables 56*a* and 56*b* can attract/release the workpiece 4. Springs 57 are provided contractedly between the work retaining table 56*a* and the plate 54 and between the work retaining table 56*b* and the plate 54, and bias the work retaining tables 56*a* and 56*b* away from the plate 54 to allow for motion of the plate 54 so that the plate 54 is not disturbed from continuously moving the other work retaining table when either one of the two work retaining tables contacts the work receiving table such that its movement is restricted.

A position of the slider 52 indicated by a solid line in FIG. 1 indicates its standby position (left end of its moving range). When the slider 52 is located at a discharging position (not shown) at the right end of the moving range, the work retaining tables 56*a* and 56*b* face, respectively, the tables 3 on the XY table 2 positioned at the work delivering position. It is noted that when the slider 52 is located at the standby position, the plate 54 is positioned at its rising end. A discharging stocker 60 is disposed so as to face the work retaining table 56*a* when the slider 52 is located at the standby position. An upper face of the discharging stocker 60 is made flat so as to be able to mount the workpieces 4 that have been machined.

A rail 59 is disposed at a position in the vertical direction between the discharging stocker 60 and the work retaining tables 56*a* and 56*b*. A work receiving table (work mounting table) 58 is movable on the rail 59 horizontally in the Y-direction. It is noted that a standby position of the work receiving table 58 is a position when it is located at the right end of its moving range and at this time, the work receiving table 58 faces the work retaining table 56*b* when the slider 52 is located at its standby position. When the work receiving table 58 is located at the left end of its moving range (discharging position), the work receiving table 58 faces the work retaining table 56*a* when the slider 52 is located at its standby position. It is noted that a control section 50 controls operation of the body portion A, the carrying-in unit B and the carrying-out unit C, as well as an interleaf carrying-out unit D and an interleaf carrying-in unit E, and others, in a third embodiment described later, respectively.

Next, steps of the present embodiment for conveying the workpieces will be explained. It is assumed that the workpieces 4 are mounted only on the supplying stocker 20 and that the sliders 12 and 52 as well as the work receiving tables 18 and 58 are located at their respective standby positions.

Step 1: Lower the plate 14 so that a lower face of the work retaining table 16*a* contacts with workpiece 4 on the supplying stocker 20, and then the work retaining table 16*a* attracts the workpiece 4. While the other work retaining table 16*b* contacts the work receiving table 18 at this time, spring 17 contracts so that motion of the plate 14 continues.

Step 2: Raise the plate 14 to a standby position.

Step 3: Move the work receiving table 18 to the receiving position (the right end in its moving range).

Step 4: Lower the plate 14 so that the workpiece 4 retained by the work retaining table 16*a* contacts the work receiving table 18. Then, release attraction of the work retaining table 16*a* to place the workpiece 4 on the work receiving table 18.

Step 5: Raise the plate 14 and move the work receiving table 18 to its standby position.

Step 6: Lower the plate 14 until a lower face of the work retaining table 16*b* contacts the workpiece 4 on the work receiving table 18 and until the lower face of the work retaining table 16*a* contacts another workpiece 4 on the supplying stocker 20, so as to cause the work retaining tables 16*a* and 16*b* to attract respective workpieces 4.

Step 7: Raise the plate 14.

Operations performed in Steps 1 through 7 described above will be referred to as a 'work retaining process' hereinafter.

Step 8: Move the XY table 2 to a work delivering position (supply side) (move forward in FIG. 1).

Step 9: Move the slider 12 so that the work retaining tables 16*a* and 16*b* face the tables 3, respectively.

Step 10: Lower the plate 14 so that the workpieces 4 held by the work retaining tables 16*a* and 16*b* contact the tables 3.

Step 11: Turn on the vacuum source (not shown) to cause the tables 3 to attract the workpieces 4, and release the attraction of the work retaining tables 16*a* and 16*b*.

Step 12: Raise the plate 14 and move the slider 12 to its standby position.

Operations performed in Steps 9 through 12 described above will be referred to as a 'work mounting process' hereinafter.

Step 13: Move the XY table 2 to a machining position (backward in FIG. 1) to start to machine the workpieces 4, and perform the work retaining process (Steps 1 through 7 described above) to cause the work retaining tables 16*a* and 16*b* to retain new workpieces 4 on the supplying stocker 20.

Step 14: After finishing this machining, move the XY table 2 to a work delivering position (discharge side).

Step 15: Move the slider 52 at its standby position to a discharging position.

Step 16: Lower the plate 54 so that lower faces of the work retaining tables 56*a* and 56*b* contact the workpieces 4 on the tables 3.

Step 17: Stop an attracting operation of the tables 3 after attracting the workpieces 4 by the work retaining tables 56*a* and 56*b*.

Step 18: Move the slider 52 to its standby position after raising the plate 54.

Operations performed in Steps 14 through 18 described above will be referred to as a 'work carrying-out process' (part of a work discharging process) hereinafter.

Step 19: Supply the new workpieces 4 to the tables 3 through the work mounting process (Steps 9 through 12) to start machining. The carrying-in unit B causes the work retaining tables 16*a* and 16*b* to retain the workpieces 4 on the supplying stocker 20 through the work retaining process. Meanwhile, the carrying-out unit C supplies the workpieces 4 retained by the work retaining tables 56*a* and 56*b* to the discharging stocker 60 through Steps 20 through 25 described below.

Step 20: Lower the plate 54 so that the workpiece 4 retained by the work retaining table 56*a* contacts the discharging stocker 60, and the workpiece 4 retained by the work retaining table 56*b* contacts the work receiving table 58. Then, stop attraction of the work retaining tables 56*a* and 56*b* to provide the workpieces 4 on the discharging stocker 60 and on the work receiving table 58, respectively. Although the other work retaining table 56*a* contacts the work receiving table 58 at this time, motion of the plate 54 is not disturbed because springs 57 contract. This allows the workpiece 4 retained by the work retaining table 56*a* to contact and be placed on the discharge stocker 60, and the workpiece 4 retained by the work retaining table 56*b* to contact and be placed on the work receiving table 58 even if a height of the work receiving table 58 differs from that of the discharge stocker 60.

Step 21: Raise the plate 54 to its standby position.

Step 22: Move the work receiving table 58 to a discharging position (left end of its moving range).

Step 23: Lower the plate 54 to attract the workpiece 4 mounted on the work receiving table 58 by the work retaining table 56*a*, and then raise the plate 54.

Step 24: Move the work receiving table 58 to its standby position.

Step 25: Lower the plate 54 so that the workpiece 4 retained by the work retaining table 56*a* contacts an uppermost workpiece 4 on the discharging stocker 60, and then stop attraction of the work retaining table 56*a*. After that, raise the plate 54 and wait until machining ends.

Operations performed in Steps 20 through 25 will be referred to as a 'work discharging process' hereinafter. It is noted that the work receiving tables 18 and 58 have been arranged so as to be movable in the horizontal direction in the embodiment described above; however, the work receiving table 18 may be fixed at its standby position. When the work receiving table 18 is to be fixed, the slider 12 may be moved so that the work retaining table 16*a* faces the work receiving table 18, instead of moving the work receiving table 18 in Step 3 described above. The work receiving table 58 may also be fixed at its standby position in the same manner.

Second Embodiment

Figure 3:
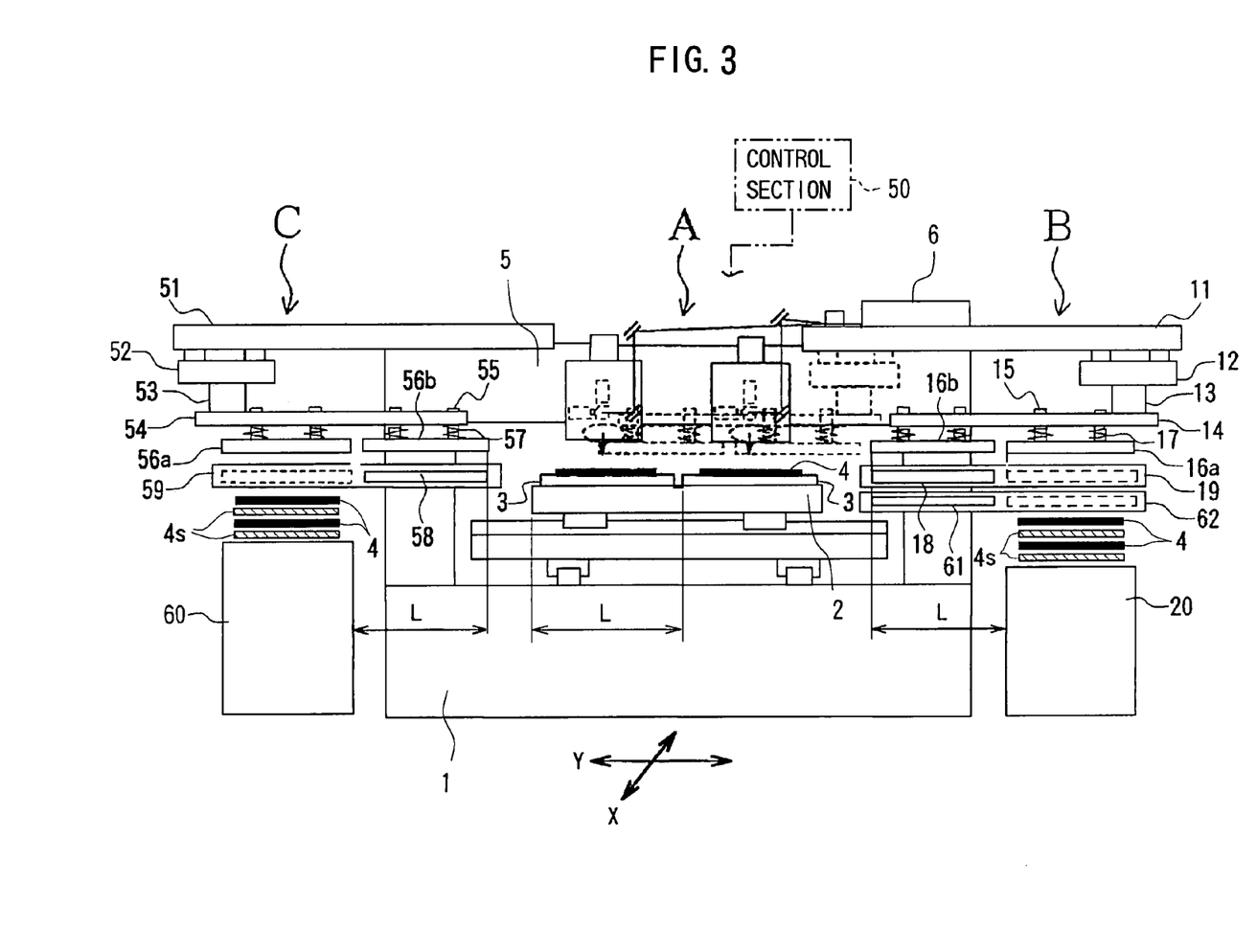
FIG. 3 is a front view showing an entire laser machining apparatus according to a second embodiment of the invention.

There is a case when workpieces are stacked by interleaving a soft sheet, e.g., a sheet of paper, resin or the like (hereinafter referred to as an 'interleaf') between the workpieces in order to prevent scratching of a surface of a workpiece. A laser machining apparatus suitable for such a case will be explained below. FIG. 3 is a front view showing an entire structure of a laser machining apparatus according to a second embodiment of the invention, wherein the same reference characters denote the same or corresponding parts with those in FIGS. 1 and 2, and an explanation thereof will be omitted here.

In FIG. 3, a rail 62 is disposed at a position in the vertical direction between rail 19 and supplying stocker 20. An interleaf receiving table (interleaf mounting table) 61 is disposed on the rail 62 so as to be movable horizontally in the Y-direction. Similarly to the work receiving table 18, a standby position of the interleaf receiving table 61 is a position when the interleaf receiving table 61 is located at the left end of its moving range and at this time, the interleaf receiving table 61 faces, through an intermediary of work receiving table 18, work retaining table 16*b* when the slider 12 is located at its standby position. A receiving position of the interleaf receiving table 61 is a position when it is located at the right end of its moving range and at this time, the interleaf receiving table 61 faces work retaining table 16*a* when the slider 12 is located at its standby position.

Next, steps for conveying workpieces of the present embodiment will be explained. It is assumed that workpieces 4 and interleaves 4*s* are alternately placed on supplying stocker 20, i.e., in a manner of inserting each interleaf 4*s* between adjacent workpieces 4. It is also assumed that sliders 12 and 52, work receiving tables 18 and 58 and the interleaf receiving table 61 are located at their respective standby positions. A workpiece 4 is mounted at a top of the supplying stocker 20. It is also noted that a reference character (G) is added to the number of each Step below in order to distinguish from the operation of the first embodiment.

Step G1: Lower plate 14 so that a lower face of the work retaining table 16*a* contacts the workpiece 4, to be machined, on the supplying stocker 20 and then cause the work retaining table 16*a* to attract the workpiece 4.

Step G2: Raise the plate 14 to its standby position.

Step G3: Move the work receiving table 18 to a receiving position (right end of its moving range).

Step G4: Lower the plate 14 so that the workpiece 4 retained by the work retaining table 16*a* contacts the work receiving table 18. Then, release attraction of the work retaining table 16*a* to place the workpiece 4 on the work receiving table 18.

Step G5: Move the work receiving table 18 to its standby position after raising the plate 14.

Step G6: Lower the plate 14 so that a lower face of the work retaining table 16*a* contacts an interleaf 4*s* on the supplying stocker 20 and then cause the work retaining table 16*a* to attract the interleaf 4*s*.

Step G7: Raise the plate 14 to its standby position.

Step G8: Move the interleaf receiving table 61 to a receiving position.

Step G9: Lower the plate 14 so that the interleaf 4*s* retained by the work retaining table 16*a* contacts the interleaf receiving table 61. Then, release attraction of the work retaining table 16*a* to place the interleaf 4*s* on the interleaf receiving table 61. Although the work retaining table 16*b* also drops together and contacts a workpiece on the work receiving table 18 at this time, the attraction of the work retaining table 16*b* is turned off and motion of the other work retaining table 16*a* is not disturbed because of springs 17.

Step G10: Move the interleaf receiving table 61 to its standby position after raising the plate 14. It is noted that a state attained by Steps G6 through G10 is equivalent to a state completed by Step 5 using no interleaf 4*s*.

Step G11: Lower the plate 14 until the lower face of the work retaining table 16*b* contacts the workpiece 4 on the work receiving table 18 and until the lower face of the work retaining table 16*a* contacts the workpiece 4 on the supplying stocker 20, and then cause the work retaining tables 16*a* and 16*b* to attract these workpieces 4. The springs 17 absorb a difference of movements of both work retaining tables 16*a* and 16*b* at this time as described above. The same also applies to cases below.

Step G12: Raise the plate 14.

Operations performed in Steps G1 through G12 described above will be referred to as an 'interleaved work retaining process' hereinafter.

Step G13: Move XY table 2 to a work delivering position (move forward in FIG. 3).

Step G14: Perform a work mounting process, i.e., Steps 9 through 12 in the first embodiment.

Step G15: As machining of the workpieces starts, carrying-in unit B retains the interleaf 4*s* at the work retaining tables 16*a* and 16*b* through Steps G16 through G20 described below.

Step G16: Lower the plate 14 so that the lower face of the work retaining table 16*a* contacts the interleaf 4*s* on the supplying stocker 20, and then cause the work retaining table 16*a* to attract this interleaf 4*s*.

Step G17: Raise the plate 14 to its standby position.

Step G18: Move the work receiving table 18 to a receiving position.

Step G19: Lower the plate 14 until the lower face of the work retaining table 16b contacts the interleaf 4s on the interleaf receiving table 61. Then, cause the work retaining table 16b to attract the interleaf 4s. It is noted that the work retaining table 16a continues to attract the other interleaf 4s at this time.

Step G20: Raise the plate 14.

These interleaves are retained by the work retaining tables 16a and 16b through Steps G16 through G20 described above. Steps G16 through G20 described above will be referred to as an 'interleaf retaining process' hereinafter.

Step G21: After ending machining, move the XY table 2 to a work delivering position.

Step G22: Carrying-out unit C performs a process of Steps G24 through G39 described below after performing the work carrying-out process, i.e., Steps 14 through 18 in the first embodiment.

Step G23: Carrying-in unit B performs the interleaved work retaining process after confirming that Step G22 has been finished and after performing a work mounting process (the interleaf 4s is placed on the table 3 in this case). It is noted that during the work mounting process when the workpieces are the interleaves, the carrying-in unit B places the interleaves 4s retained by the work retaining tables 16a and 16b through the interleaf retaining process described above, on the table 3 by moving the plate 14 to a position indicated by dot lines (the left end of its moving range) by use of the slider 12, by dropping the work retaining tables 16a and 16b on the table 3 at the delivering position so that the interleaves 4s contact the table 3 and by stopping attraction.

Then, after waiting for a process in Step G26 described later to end, the carrying-in unit B performs the work mounting process. It is noted that machining starts when the work mounting process ends.

Step G24: Lower the plate 54 so that a finished workpiece 4 retained by the work retaining table 56a contacts discharging stocker 60, and the workpiece 4 retained by the work retaining table 56b contacts the work receiving table 58. Then, stop attraction of the work retaining tables 56a and 56b to release the workpieces 4 to the discharging stocker 60 and the work receiving table 58, respectively.

Step G25: Raise the plate 14.

Step G26: After ending the process of Step G23, the carrying-out unit C performs a work carrying-out process. That is, the carrying-out unit C moves the plate 54 to the left end of its moving range by use of the rail 51, drops it so that the work retaining tables 56a and 56b attract the interleaves 4s and moves the plate 54 to its standby position. After that, the carrying-out unit C performs an interleaved work discharging process composed of Steps G27 through G39 described below.

Step G27: Lower the plate 54 so that the Interleaf 4s retained by the work retaining table 56a contacts a workpiece on the discharging stocker 60. Then, stop attraction of the work retaining table 56a to place the interleaf 4s on the discharging stocker 60. It is noted that the work retaining table 56b continues to retain its interleaf 4s at this time.

Step G28: Raise the plate 54.

Step G29: Move the work receiving table 58 to the discharging position.

Step G30: Lower the plate 54 so that the work retaining table 56a attracts the workpiece 4 on the work receiving table 58, and then raise the plate 54.

Step G31: Move the work receiving table 58 to its standby position.

Step G32: Lower the plate 54 to mount the workpiece 4 retained by the work retaining table 56a on the discharging stocker 60, and to mount the interleaf 4s retained by the work retaining table 56b on the work receiving table 58.

Step G33: Raise the plate 54.

Step G34: Move the work receiving table 58 to the discharging position.

Step G35: Lower the plate 54 so that the work retaining table 56a attracts the interleaf 4s on the work receiving table 58.

Step G36: Raise the plate 54.

Step G37: Move the work receiving table 58 to its standby position.

Step G38: Lower the plate 54 to place the interleaf 4s retained by the work retaining table 56a on the workpiece 4 on the discharging stocker 60.

Step G39: Raise the plate 54 and wait until machining is completed.

Preferably, operations for attracting/placing the workpieces 4 or the interleaves 4s by the work retaining tables 16a, 16b, 56a and 56b may be performed reliably and quickly by providing elevator units to the supplying stocker 20 and the discharging stocker 60 so that a height of an uppermost workpiece 4 becomes the same with that of the workpiece 4 or the interleaf 4s mounted on the work receiving table 18 or 58 in both cases of the first and second embodiments.

Third Embodiment

Figure 4:
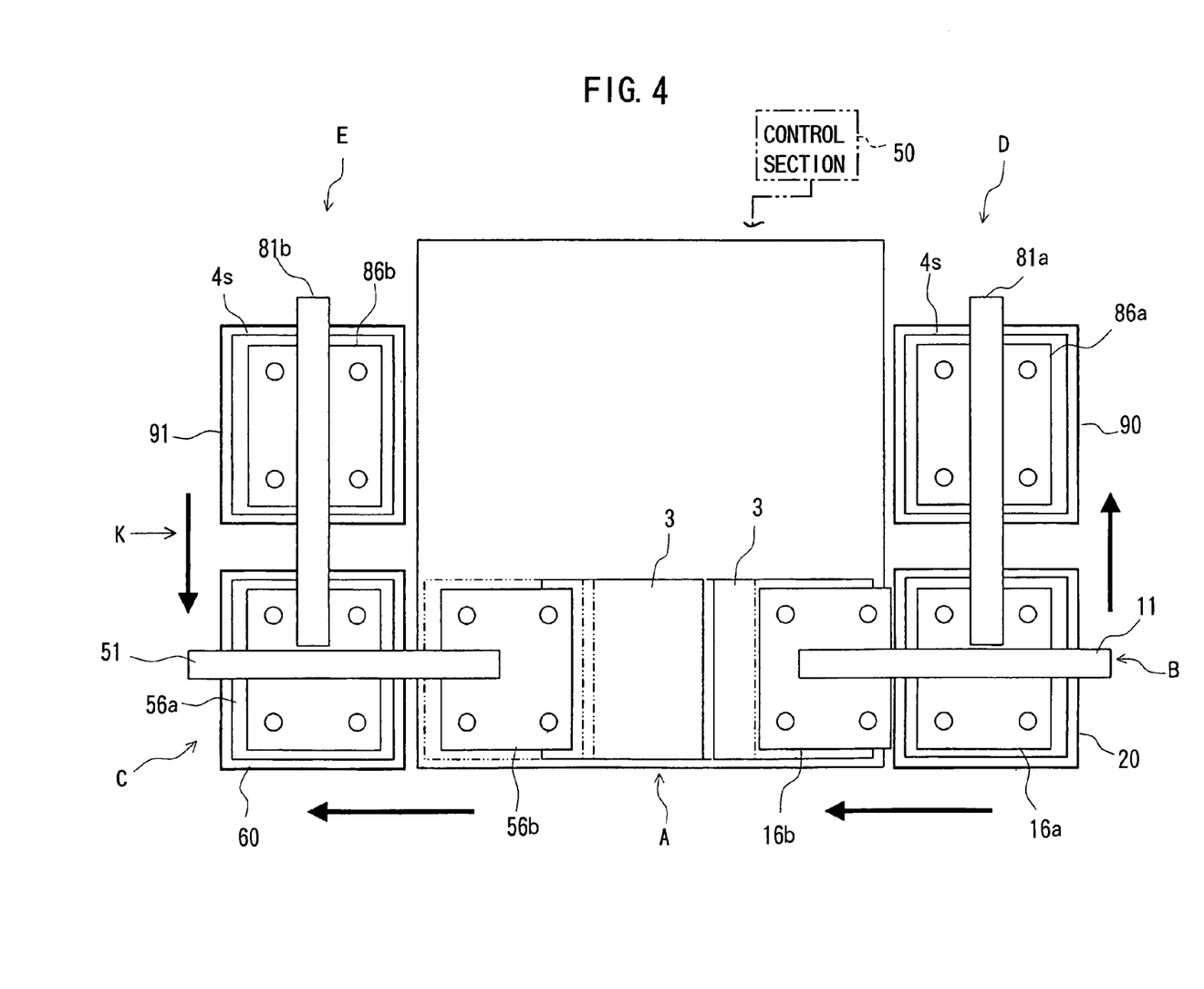
FIG. 4 is a plan view showing an entire laser machining apparatus according to a third embodiment of the invention.
Figure 5:
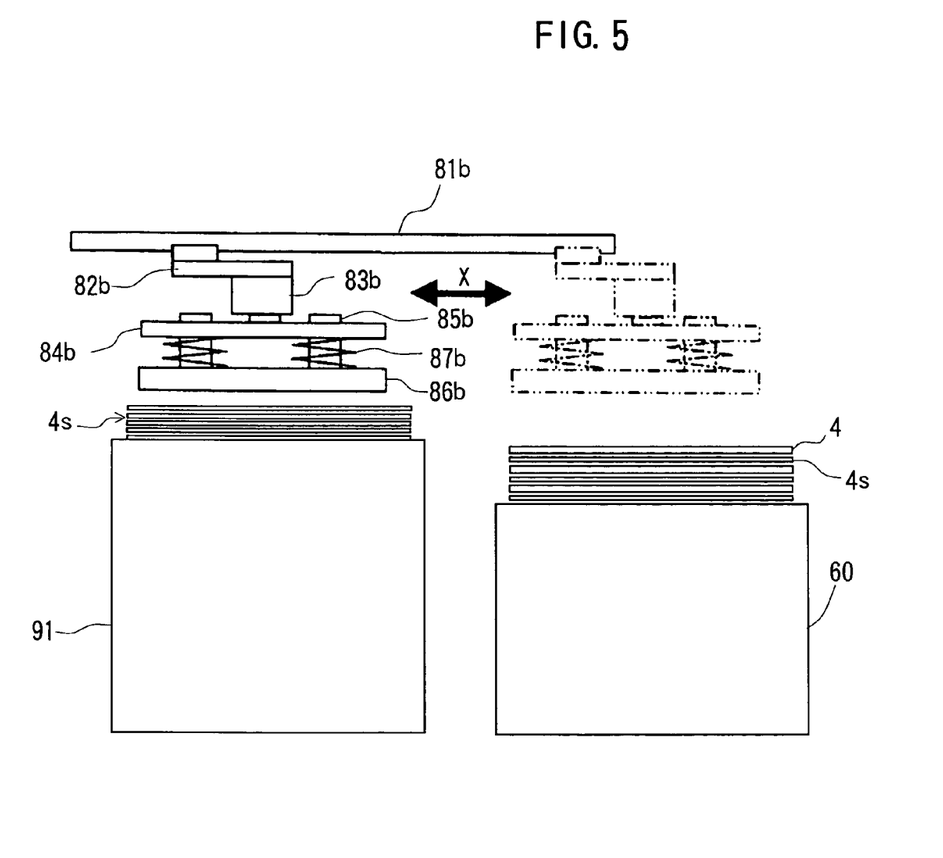
FIG. 5 is a view taken in a direction of arrow K in FIG. 4.

FIG. 4 is a plan view showing structure of a laser machining apparatus according to a third embodiment of the invention, and FIG. 5 is a view in a direction of arrow K in FIG. 4, wherein the same or corresponding parts with those in FIGS. 1 and 2 will be denoted by the same reference numerals and an explanation thereof will be omitted here. It is noted that a front view of the apparatus of the present embodiment is substantially the same as that shown in FIG. 1.

An interleaf carrying-out unit (interleaf removing and carrying-out unit) D is disposed behind the carrying-in unit (supply-side transfer unit) B in FIG. 1, and an interleaf carrying-in unit (interleaving unit) E is disposed behind the carrying-out unit (discharge-side transfer unit) C in FIG. 1 (see FIG. 4). Here, the interleaf carrying-out unit D is a unit for retaining an interleaf 4s on a workpiece 4 placed on supplying stocker 20 and for placing the interleaf on an interleaf discharging table 90. The interleaf carrying-in unit E is a unit for retaining an interleaf 4s placed on an interleaf supplying table 91 to place it on a workpiece 4 mounted on discharging stocker 60. Because structure of the interleaf carrying-out unit D is the same as that of the interleaf carrying-in unit E, a subscript (a) is appended to reference numerals denoting parts of the interleaf carrying-out unit D, and a subscript (b) is appended to reference numerals of the Interleaf carrying-in unit E. The interleaf carrying-in unit E will be explained below.

As shown in FIG. 5, a rail 81b which extends horizontally in the X direction in this figure supports a slider 82b of the interleaf carrying-in unit E so as to be reciprocally movable. One end of a lifter 83b, which is capable of extending/contracting in the vertical direction in FIG. 5, is fixed to a lower part of the slider 82b. A plate 84b is fixed to another end (edge) of the lifter 83b. The plate 84b supports a work retaining table (work retaining member) 86b so as to be movable in the vertical direction in FIG. 5 through an intermediary of guide rods 85b. A plurality of holes connected to a hollow section inside the table 86b is made in a lower face of the work retaining table 86b. The hollow section is connected to a vacuum source (not shown). Springs 87b are provided in contraction between the work retaining table 86b and the plate 84b to bias the work retaining table 86b away from the plate 84b.

A standby position of the slider 82b is a position indicated by a solid line in FIG. 5, and a position indicated by a two-dot chain line in this figure is an interleaf supplying position. In the interleaf supplying position, the work retaining table 86b is located at a position facing discharging stocker 60, i.e., a position overlapping work retaining table 56a at its standby position. It is noted that the plate 84b is located at its rising end when the slider 82b is located at its standby position.

The interleaf supplying table 91 is disposed at a position facing the slider 82b at its standby position. Interleaves 4s are stacked on the interleaf supplying table 91.

Next, operation of the interleaf carrying-in unit E will be explained. The interleaf carrying-in unit E lowers the plate 84b so that the lower face of the work retaining table 86b contacts an interleaf 4s stacked on the interleaf supplying table 91 and causes the work retaining table 86b to attract this interleaf 4s. Then, the carrying-in unit E stands by while raising the plate 84b to its standby position.

Receiving an operating command from the control section 50, the interleaf carrying-in unit E moves the slider 82b so that the work retaining table 86b faces the discharging stocker 60. Then, the carrying-in unit E lowers the plate 84b so that the interleaf 4s attracted by the work retaining table 86b contacts the workpiece 4 mounted on the discharging stocker 60, and then releases attraction to place the interleaf 4s on the workpiece 4. After that, the carrying-in unit E raises the plate 84b to return it to its standby position. Then, the carrying-in unit E stands by while retaining a next interleaf 4s on the work retaining table 86b through Steps described above.

Because the work retaining table 86b at the interleaf supplying position and the work retaining table 56a at its standby position interfere with each other as described above, the control section 50 controls the slider 82b and the slider 52 precisely so that they do not interfere with each other. It is noted that operation of the interleaf carrying-out unit D is the same as that of the interleaf carrying-in unit E described above and is readily understood from the operation of the interleaf carrying-in unit E, so that its explanation will be omitted here.

Next, work conveying steps of the present embodiment will be explained with reference to FIGS. 4 and 5 together with FIG. 1. It is noted that while the steps in the first embodiment are applied here as they are, additional steps will be described by appending subscripts (a), (b) and (c) to Step Nos. It is assumed that the workpieces 4 are mounted only on the supplying stocker 20 and the sliders 12, 52, 82a and 82b, as well as the work receiving tables 18 and 58 being located at their standby positions, respectively.

Step 1: Lower the plate 14 so that the lower face of the work retaining table 16a contacts a workpiece 4, to be machined, on the supplying stocker 20 and cause the work retaining table 16a to attract the workpiece 4.

Step 2: Raise the plate 14 to its standby position.

Step 3: Move the work receiving table 18 to the receiving position (the right end of its moving range).

Step 4: Lower the plate 14 so that the workpiece 4 retained by the work retaining table 16a contacts the work receiving table 18, and release the attraction of the work retaining table 16a to place the workpiece 4 on the work receiving table 18.

Step 5: Raise the plate 14 and move the work receiving table 18 to its standby position.

Step 5a: Move the slider 12 to dislocate the work retaining table 16a from a position facing the supplying stocker 20.

Step 5b: Operate the interleaf carrying-out unit D to remove the interleaf 4s on the supplying stocker 20 and place this removed interleaf 4s on the interleaf discharging table 90.

Step 5c: Return the slider 12 to its standby position.

Step 6: Lower the plate 14 until the lower face of the work retaining table 16b contacts the workpiece 4 on the work receiving table 18 and until the lower face of the work retaining table 16a contacts the workpiece 4 on the supplying stocker 20, and cause the work retaining tables 16a and 16b to attract these workpieces 4, respectively.

Step 7: Raise the plate 14.

Operation performed in Steps 1 through 7 and in Steps 5a through 5c described above will be referred to as a 'second work retaining process' hereinafter.

Step 8: Move the XY table 2 to the work delivering position (move forward in FIG. 1).

Step 9: Move the slider 12 so that the work retaining tables 16a and 16b face the tables 3, respectively.

Step 9a: Operate the interleaf carrying-out unit D to remove the interleaf 4s on the supplying stocker 20 via attraction by the work retaining table 86a.

Step 10: Lower the plate 14 so that the workpieces 4 retained by the work retaining tables 16a and 16b contact the tables 3, respectively.

Step 11: Turn on the vacuum source (not shown) to cause the tables 3 to attract the workpieces 4 and release attraction of the work retaining tables 16a and 16b.

Step 12: Raise the plate 14 and move the slider 12 to its standby position.

Operations performed in Steps 9 through 12 and Step 9a described above will be referred to as a 'second work mounting process' hereinafter.

Step 13: Start to machine the workpieces 4 and perform the second work retaining process (Steps 1 through 7 and Steps 5a through 5c described above) so that the work retaining tables 16a and 16b retain new workpieces 4 on the supplying stocker 20.

Step 14: After finishing machining, move the XY table 2 to the work delivering position.

Step 15: Move the slider 52 at its standby position to the discharging position.

Step 16: Lower the plate 54 so that the lower face of the work retaining tables 56a and 56b contacts the workpieces 4 on the tables 3.

Step 17: Stop an attracting operation of the tables 3 after attracting the workpieces 4 by the work retaining tables 56a and 56b.

Step 18: Move the slider 52 to its standby position after raising the plate 54.

That is, the 'work carrying-out process' performed in Steps 15 through 18 is the same as that in the first embodiment.

Step 19: Supply a new workpiece 4 to the table 3 through the second work mounting process and start machining. The carrying-in unit B causes the work retaining tables 16a and 16b to retain workpieces 4, to be machined, on the supplying stocker 20 through the second work retaining process.

Meanwhile, the carrying-out unit C mounts finished workpieces 4, retained by the work retaining tables 56a and 56b, to the discharging stocker 60 through Steps 20 through 25 described below.

Step 20: Lower the plate 54 so that the workpiece 4 retained by the work retaining table 56a contacts the discharging stocker 60, and the workpiece 4 retained by the work retaining table 56b contacts the work receiving table 58. Then, stop attraction of the work retaining tables 56a and 56b to mount the workpieces 4 on the discharging stocker 60 and the work receiving table 58.

Step 21: Raise the plate 54 to its standby position.

Step 22: Move the work receiving table 58 to the discharging position (left end of its moving range).

Step 23: Lower the plate 54 so that the work retaining table 56a attracts the workpiece 4 mounted on the work receiving table 58, and then raise the plate 54.

Step 24: Move the work receiving table 58 to its standby position.

Step 24a: Move the slider 52 to dislocate the work retaining table 56a from a position facing the discharging stocker 60.

Step 24b: Operate the interleaf carrying-in unit E to place the interleaf 4s retained by the work retaining table 86b on finished work on the discharging stocker 60.

Step 24c: Return the slider 52 to its standby position.

Step 25: Lower the plate 54 so that the workpiece 4 retained by the work retaining table 56a contacts an uppermost interleaf 4s on the discharging stocker 60, and then stop attraction of the work retaining table 56a. After that, raise the plate 54 and wait until machining ends.

It is needless to say that the same steps with those in the first embodiment are performed when no interleaf 4s is interposed between the workpieces 4 mounted on the supplying stocker 20. Although the apparatus of the third embodiment requires additional units and a larger installation area as compared to that of the second embodiment, it is advantageous in that it enables work efficiency to be improved considerably. It is noted that the interleaves 4s may be utilized effectively by transferring those interleaves 4s discharged to the interleaf discharging table 90 to the interleaf supplying table 91.

It is also noted that the work receiving table 18 may be fixed at its standby position in the third embodiment similarly to the case of the first embodiment. When the work receiving table 18 is to be fixed, the slider 12 may be moved so that the work retaining table 16a faces the work receiving table 18, instead of moving the work receiving table 18 in Step 3 described above. The interleaf carrying-out unit D may be operated while moving the slider 12. The work receiving table 58 may also be fixed at its standby position in the same manner.

Additionally, machining accuracy may be improved by providing a work positioning device in each of the supplying stocker 20, the work receiving table 18 and the tables 3 in any of the first through third embodiments. It is also possible to effectively prevent misalignment of the workpiece 4 or the interleaf 4s by providing attracting structure in the work receiving tables 18 and 58, respectively.

It is also possible to provide an arrangement so as to be able to machine a plurality of workpieces simultaneously by disposing a half-mirror or a beam splitter, instead of the acoustic optical modulator 7.

Further, although the work retaining tables 16a and 16b have been moved up and down by the lifter 13 in the embodiments described above, a lifting unit may be provided at the work retaining tables 16a and 16b, respectively, so that these tables can move up and down, respectively. Although a case of two tables 3 has been described, it is possible to machine workpieces through steps similar to those described above even when there are at least three tables. The present invention is also applicable to a case when a plurality of workpieces is mounted on one table.

While the preferred embodiments have been described, variations thereto will occur to those skilled in the art within the scope of the present inventive concepts which are delineated by the following claims.

What is claimed is:

1. A laser machining apparatus comprising:
   laser irradiating units;
   mounting sections for facing said laser irradiating units, respectively;
   a single supply stocker;
   a supply-side transfer unit for removing from said single supply stocker, and holding, workpieces equal in number to that of said laser irradiating units, and for simultaneously supplying the workpieces to said mounting sections, respectively;
   a discharge-side transfer unit for simultaneously removing from said mounting sections the workpieces after having been simultaneously processed by said laser irradiating units;
   a discharge stocker;
   a supply-side support table; and
   a discharge-side support table,
   wherein said supply-side transfer unit includes supply-side retaining members capable of holding/releasing the workpieces such that said supply-side transfer unit is for simultaneously supplying the workpieces to said mounting sections by using said supply-side retaining members to simultaneously transfer the workpieces to said mounting sections while the workpieces are being held by said supply-side retaining members, respectively, and then causing said supply-side retaining members to release the workpieces,
   wherein said discharge-side transfer unit includes discharge-side retaining members capable of holding/releasing the workpieces such that said discharge-side transfer unit is for simultaneously removing the workpieces from said mounting sections by using said discharge-side retaining members to simultaneously remove the workpieces from said mounting sections, respectively,
   wherein said supply-side support table, said supply-side retaining members and said supply stocker are constructed and arranged such that said supply-side transfer unit is for removing from said supplying stocker, and holding, the workpieces by
      (i) having one of said supply-side retaining members face said supply stocker and remove a first of the workpieces from said supply stocker, then
      (ii) releasing the first of the workpieces from said one of said supply-side retaining members onto said supply-side support table, and then
      (iii) using another of said supply-side retaining members to hold the first of the workpieces, and using said one of said supply-side retaining members to remove from said supply stocker and hold, a second of the workpieces, and
   wherein said discharge-side support table said discharge-side retaining members and said discharge stocker are constructed and arranged such that after said discharge-side retaining members simultaneously remove the workpieces from said mounting sections, (i) one of the workpieces is released from one of said discharge-side retaining members onto said discharge stocker and another of the workpieces is released from another of said discharge-side retaining members onto said discharge-side support table, and then (ii) said one of said discharge-side retaining members removes the another of the workpieces from said discharge-side support table and releases this workpiece onto said discharge stocker.

2. The laser mounting apparatus according to claim 1, wherein said mounting sections, said supply-side retaining members, said supply stocker, said discharge-side retaining members and said discharge stocker are arranged along an axial direction, with (i) said supply stocker and said supply-side retaining members being disposed on one side of said mounting sections such that said one of said supply-side retaining members is positioned farther from said mounting sections than is said another of said supply-side retaining members, and (ii) said discharge stocker and said discharge-side retaining members are disposed on another side of said mounting sections such that said one of said discharge-side retaining members is positioned farther from said mounting sections than is said another of said discharge-side retaining members, said supply-side retaining members and said discharge-side retaining members are vertically and horizontally movable, said supply-side retaining members are equal in number to that of said laser irradiating units, and said discharge-side retaining members are equal in number to that of said laser irradiating units.

3. The laser machining apparatus according to claim 2, wherein said supply-side support table is movable in the axial direction between said mounting sections and said supply stocker, and/or said discharge-side support table is movable in the axial direction between said mounting sections and said discharge stocker.

4. The laser machining apparatus according to claim 2, wherein said supply-side support table is between said mounting sections and said supply stocker, and/or said discharge-side support table is between said mounting sections and said discharge stocker.

5. The laser machining apparatus according to claim 2, wherein said supply-side support table is movable in the axial direction between said supply stocker and said mounting sections, and further comprising:

an interleaf support table for receiving interleaves, said interleaf support table being movable in the axial direction between said supply stocker and said mounting sections, and also being movable in the vertical direction between said supply-side support table and said supply stocker.

6. The laser machining apparatus according to claim 2, wherein said discharge-side support table is movable in the axial direction between said discharge stocker and said mounting sections.

7. The laser machining apparatus according to claim 2, further comprising:

an interleaf removing and carrying-out unit for removing an interleaf from a workpiece on said supply stocker; and an interleaving unit for placing the interleaf on the workpiece after the workpiece has been processed by one of said laser irradiating units, wherein said interleaf removing and carrying-out unit is disposed on a side of said supply stocker, and said interleaving unit is disposed on a side of said discharge stocker.

8. The laser machining apparatus according to claim 2, wherein said supply-side retaining members comprise two supply-side retaining tables, and said discharge-side retaining members comprise two discharge-side retaining tables.

9. The laser machining apparatus according to claim 1, wherein said mounting sections, said supply-side transfer unit and said discharge-side transfer unit are constructed and arranged such that (i) while the workpieces are being processed by said laser irradiating units, new workpieces equal in number to that of said laser irradiating units are being removed from said supply stocker and held by said supply-side transfer unit, and (ii) after the workpieces have been simultaneously removed from said mounting sections by said discharge-side transfer unit, the new workpieces being held by said supply-side transfer unit are simultaneously supplied to said mounting sections.

10. A method comprising:

using a supply-side transfer unit to remove from a single supply stocker, and hold, workpieces equal in number to that of laser irradiating units, and to simultaneously supply said workpieces to mounting sections that are to respectively face said laser irradiating units; and using a discharge-side transfer unit to simultaneously remove said workpieces from said mounting sections after said workpieces have been simultaneously processed by said laser irradiating units, wherein said supply-side transfer unit includes supply-side retaining members capable of holding/releasing said workpieces such that using said supply-side transfer unit to simultaneously supply said workpieces to said mounting sections comprises using said supply-side retaining members to simultaneously transfer said workpieces to said mounting sections while said workpieces are being held by said supply-side retaining members, respectively, and then causing said supply-side retaining members to release said workpieces, wherein said discharge-side transfer unit includes discharge-side retaining members capable of holding/releasing said workpieces such that using said discharge-side transfer unit to simultaneously remove said workpieces from said mounting sections comprises using said discharge-side retaining members to simultaneously remove said workpieces from said mounting sections, respectively, and wherein using said supply-side transfer unit to remove from said supply stocker, and hold, said workpieces, comprises (i) having one of said supply-side retaining members face said supply stocker and remove a first of said workpieces from said stocker, then (ii) releasing said first of said workpieces from said one of said supply-side retaining members onto a supply-side support table, and then (iii) using another of said supply-side retaining members to hold said first of said workpieces, and using said one of said supply-side retaining members to remove from said supply stoker, and hold, a second of said workpieces, and further comprising:

after using said discharge-side retaining members to simultaneously remove said workpieces from said mounting sections, (i) releasing one of said workpieces from one of said discharge-side retaining members onto a discharge stocker, and releasing another of said workpieces from another of said discharge-side retaining members onto a discharge-side support table, and then (ii) using said one of said discharge-side retaining members to remove said another of said workpieces from said discharge-side support table and release this workpiece onto said discharge stocker.

11. The method according to claim 10, wherein said supply-side retaining members comprise two supply-side retaining tables, and said discharge-side retaining members comprise two discharge-side retaining tables.

12. The method according to claim 10, wherein workpieces and interleaves are alternately stacked on said supply stocker, and further comprising:

while said workpieces are held by said two supply-side retaining tables, respectively, receding an interleaf support table having thereon a first interleaf;

after said workpieces are released onto said mounting sections by said two supply-side retaining tables, using said two supply-side retaining tables to hold said first interleaf and a second interleaf;

after using said two discharge-side retaining tables to remove said workpieces from said mounting sections, after said workpieces have been processed by said laser irradiating units, using said two supply-side retaining tables to release said first and second interleaves onto said mounting sections, respectively;

after releasing one of said workpieces from one of said two discharge-side retaining tables onto said discharge-side support table and then receding said discharge-side support table, and after releasing the other of said workpieces from the other of said two discharge-side retaining tables onto said discharge stocker, using said two discharge-side retaining tables to remove from said work mounting sections, and hold, said first and second interleaves, respectively; and after releasing onto said other of said workpieces, on said discharge stocker, one of said first and second interleaves from said another of said two discharge-side retaining tables, using said another of said discharge-side retaining tables to remove said one of said workpieces from said discharge-side support table and release this workpiece onto said one of said first and second interleaves on said discharge stocker, and then using said another of said discharge-side retaining tables to place said second one of said first and second interleaves onto said one of said workpieces on said discharge stocker such that said workpieces and said first and second interleaves are alternately stacked on said discharge stocker.

13. The method according to claims 10, wherein workpieces and interleaves are alternately stacked on said supply stocker, and further comprising:

using an interleaf removing and carrying-out unit to remove an interleaf from said supply stocker; and using an interleaf supplying unit to supply said interleaf onto said discharge stocker.

14. The method according to claims 10, wherein using said supply-side transfer unit to remove and hold said workpieces, and to supply said workpieces to said mounting sections includes horizontally and vertically moving said supply-side transfer unit; and using said discharge-side transfer unit to remove said workpieces from said mounting sections includes horizontally and vertically moving said discharge-side transfer unit.

15. The method according to claim 10, further comprising:

while the workpieces are being processed by said laser irradiating units, using said supply-side transfer unit to remove from said supply stocker new workpieces equal in number to that of said laser irradiating units, and hold said new workpieces; and after said workpieces have been simultaneously removed from said mounting sections by said discharge-side transfer unit, using said supply-side transfer unit to supply said new workpieces to said mounting sections.

* * * * *